(12) United States Patent
Wang (10) Patent No.: US 9,385,854 B2
(45) Date of Patent: Jul. 5, 2016

(54) INTERFERENCE COORDINATION METHOD AND BASE STATION

(71) Applicant: Huawei Device Co., Ltd., Shenzhen (CN)

(72) Inventor: Rui Wang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/825,031

(22) Filed: Aug. 12, 2015

(65) Prior Publication Data

US 2015/0349939 A1 Dec. 3, 2015

Related U.S. Application Data

(63) Continuation of application No. PCT/CN2014/076081, filed on Apr. 24, 2014.

(30) Foreign Application Priority Data

Apr. 28, 2013 (CN) .......................... 2013 1 0157574

(51) Int. Cl.
*H04W 72/00* (2009.01)
*H04L 5/00* (2006.01)
(Continued)

(52) U.S. Cl.
CPC .............. *H04L 5/0073* (2013.01); *H04B 17/26* (2015.01); *H04B 17/318* (2015.01); *H04B 17/336* (2015.01); *H04B 17/345* (2015.01); *H04B 17/382* (2015.01); *H04L 5/0057* (2013.01); *H04W 72/082* (2013.01); *H04W 72/10* (2013.01); *H04W 76/023* (2013.01); *H04L 5/0094* (2013.01)

(58) Field of Classification Search
CPC ...... H04W 72/04; H04W 76/02; H04W 16/10
USPC ........................ 455/450, 423, 561, 515, 422.1
See application file for complete search history.

(56) References Cited

U.S. PATENT DOCUMENTS

| | | | |
|---|---|---|---|
| 6,212,368 B1 * | 4/2001 | Ramesh | H04B 7/0808 455/132 |
| 2009/0137241 A1 * | 5/2009 | Yavuz | H04W 74/04 455/423 |

(Continued)

FOREIGN PATENT DOCUMENTS

| | | |
|---|---|---|
| CN | 102325327 A | 1/2012 |
| CN | 102365897 A | 2/2012 |

(Continued)

*Primary Examiner* — Nghi H Ly
(74) *Attorney, Agent, or Firm* — Slater Matsil, LLP (57) ABSTRACT

An interference coordination method includes: receiving, by a base station, an interference indicator that is in at least one subframe and sent by a user equipment, where the interference indicator includes RSSIs that are received by the user equipment in the at least one subframe and of all blocks PRBs, or sorted index values of the RSSIs of all the PRBs; determining, by the base station, a first list of candidate user equipment identities with a highest priority according to the interference indicator and uplink resource allocation information in the at least one subframe of a serving cell; and determining, by the base station, that a communication link of a macro cell corresponding to an identity, in the first list of candidate user equipment identities, of a user equipment with smallest interference is a reusable resource for D2D communication.

9 Claims, 3 Drawing Sheets

(51) Int. Cl.
*H04W 72/10* (2009.01)
*H04B 17/318* (2015.01)
*H04W 72/08* (2009.01)
*H04W 76/02* (2009.01)
*H04B 17/336* (2015.01)
*H04B 17/26* (2015.01)
*H04B 17/345* (2015.01)
*H04B 17/382* (2015.01)

(56) References Cited

U.S. PATENT DOCUMENTS

2010/0093364 A1 4/2010 Ribeiro et al.
2010/0240312 A1 9/2010 Peng et al.
2013/0089040 A1* 4/2013 Tabet ............... H04L 5/0073
　　　　　　　　　　　　　　　　　370/329
2014/0119334 A1* 5/2014 Kazmi ............... H04L 5/0032
　　　　　　　　　　　　　　　　　370/330

FOREIGN PATENT DOCUMENTS

| CN | 103024911 A | 4/2013 |
| CN | 103068049 A | 4/2013 |
| WO | 2011050519 A1 | 5/2011 |

* cited by examiner

INTERFERENCE COORDINATION METHOD AND BASE STATION

This application is a continuation of international Application No. PCT/CN2014/076081, filed on Apr. 24, 2014, which claims priority to Chinese Patent Application No. 201310157574.5, filed on Apr. 28, 2013, both of which are hereby incorporated by reference in their entireties.

TECHNICAL FIELD

The present invention belongs to the communications field, and in particular, to an interference coordination method and a base station.

BACKGROUND

For a subsequent research project of Long Term Evolution Advanced (LTE-A) proposed in the 3GPP, a new technology needs to be provided based on LTE to meet requirements of IMT-Advanced (International Mobile Telecommunications-Advanced), so as to provide a higher data rate and system capacity. On a cellular network, an IMT-A system is allowed to support device-to-device (D2D) communication to improve a spectrum use rate. D2D communication is a technology in which data exchange or a service is directly performed without transfer through a base station. On the cellular network, D2D communication works in a licensed frequency band, and a resource occupied by each D2D communication link is the same as a resource occupied by a cellular communication link. When sharing a resource with the cellular network, D2D communication also brings some interference. How to effectively coordinate interference between a cellular network and D2D communication is a problem that needs to be resolved urgently.

SUMMARY

A purpose of embodiments of the present invention is to provide an interference coordination method, aimed at effectively resolving a problem of interference between a cellular network and D2D communication.

According to a first aspect, an interference coordination method is provided, where the method includes:

receiving, by a base station, an interference indicator that is in at least one subframe and sent by a user equipment, where the interference indicator includes received signal strength indicators RSSIs that are received by the user equipment in the at least one subframe and of all physical resource blocks PRBs, or sorted index values of the RSSIs of all the PRBs;

determining, by the base station, a first list of candidate user equipment identities with a highest priority according to the interference indicator and uplink resource allocation information in the at least one subframe of a serving cell, where the serving cell is a cell managed by the base station and serving the user equipment, and the first list of candidate user equipment identities includes a candidate user equipment identity of the serving cell and interference information of a communication link of a macro cell corresponding to the candidate user equipment identity of the serving cell; and determining, by the base station, that a communication link of a macro cell corresponding to an identity, in the first list of candidate user equipment identities, of a user equipment with smallest interference is a reusable resource for device-to-device (D2D) communication.

With reference to the interference coordination method in the first aspect, in a first optional solution of the first aspect, the determining, by the base station, a first list of candidate user equipment identities with a highest priority according to the interference indicator and uplink resource allocation information in the at least one subframe of a serving cell includes:

determining, by the base station, the first list of candidate user equipment identities with a highest priority according to the interference indicator and the uplink resource allocation information; acquiring, by the base station, a second list of candidate user equipment identities of a neighboring cell, where the second list of candidate user equipment identities includes a candidate user equipment identity of the neighboring cell and interference information of a communication link of a macro cell corresponding to the candidate user equipment identity of the neighboring cell; and adjusting the first list of candidate user equipment identities according to the second list of candidate user equipment identities.

With reference to the first optional solution of the first aspect, in a second optional solution of the first aspect, the adjusting the first list of candidate user equipment identities according to the second list of candidate user equipment identities specifically includes:

deleting an identity of a user equipment with large interference in the neighboring cell from the first list of candidate user equipment identities, where the identity of the user equipment with large interference in the neighboring cell is specifically an identity, in the second list of candidate user equipment identities, of a user equipment whose interference strength exceeds a threshold.

With reference to the first optional solution of the first aspect, in a third optional solution of the first aspect, the acquiring, by the base station, a second list of candidate user equipment identities of a neighboring cell specifically includes:

if the serving cell and the neighboring cell are served by a same base station, directly acquiring, by the base station, the second list of candidate user equipment identities of the neighboring cell; and if the serving cell and the neighboring cell are not served by a same base station, receiving, by the base station, the second list of candidate user equipment identities that is sent by a base station that serves the neighboring cell.

With reference to the interference coordination method in the first aspect, the first optional solution of the first aspect, the second optional solution of the first aspect, or the third optional solution of the first aspect, in a fourth optional solution of the first aspect, after the determining, by the base station, that a communication link of a macro cell corresponding to an identity, in the first list of candidate user equipment identities, of a user equipment with smallest interference is a reusable resource for device-to-device (D2D) communication, the method further includes:

if the serving cell and the neighboring cell are not served by a same base station, sending, by the base station, the first list of candidate user equipment identities to the base station that serves the neighboring cell.

According to a second aspect, a base station is provided, where the base station includes:

a receiving unit, configured to receive an interference indicator that is in at least one subframe and sent by a user equipment, where the interference indicator includes received signal strength indicators RSSIs that are received by the user equipment in the at least one subframe and of all PRBs, or sorted index values of the RSSIs of all the PRBs;

a determining unit, configured to determine a first list of candidate user equipment identities with a highest priority according to the interference indicator and uplink resource allocation information in the at least one subframe of a serving cell, where the serving cell is a cell managed by the base station and serving the user equipment, and the first list of candidate user equipment identities includes a candidate user equipment identity of the serving cell and interference information of a communication link of a macro cell corresponding to the candidate user equipment identity of the serving cell; and a selecting unit, configured to determine that a communication link of a macro cell corresponding to an identity, of candidate user equipment identities, of a user equipment with smallest interference in the first list is a reusable resource for device-to-device (D2D) communication.

With reference to the base station in the second aspect, in a first optional solution of the second aspect, the determining unit is specifically configured to determine the first list of candidate user equipment identities with a highest priority according to the interference indicator and the uplink resource allocation information; acquire a second list of candidate user equipment identities of a neighboring cell, where the second list of candidate user equipment identities includes a candidate user equipment identity of the neighboring cell and interference information of a communication link of a macro cell corresponding to the candidate user equipment identity of the neighboring cell; and adjust the first list of candidate user equipment identities according to the second list of candidate user equipment identities.

With reference to the base station in the second aspect, in a second optional solution of the second aspect, the determining unit includes:

a first confirming module, configured to determine the first list of candidate user equipment identities with a highest priority according to the interference indicator and the uplink resource allocation information;

an acquiring module, configured to: if the serving cell and a neighboring cell are served by a same base station, directly acquire a second list of candidate user equipment identities of the neighboring cell; and if the serving cell and the neighboring cell are not served by a same base station, receive a second list of candidate user equipment identities that is sent by a base station that serves the neighboring cell; where the second list of candidate user equipment identities includes a candidate user equipment identity of the neighboring cell and interference information of a communication link of a macro cell corresponding to the candidate user equipment identity of the neighboring cell; and an adjusting module, configured to delete an identity of a user equipment with large interference in the neighboring cell from the first list of candidate user equipment identities, where the identity of the user equipment with large interference in the neighboring cell is specifically an identity, in the second list of candidate user equipment identities, of a user equipment whose interference strength exceeds a threshold.

With reference to the base station in the second aspect, the first optional solution of the second aspect, or the second optional solution of the second aspect, in a third optional solution of the second aspect, the base station further includes:

a sending unit, configured to: if the serving cell and the neighboring cell are not served by a same base station, send the first list of candidate user equipment identities to the base station that serves the neighboring cell.

In the embodiments of the present invention, when an identity of a reusable resource for D2D communication is selected according to the technical solutions provided in the present invention, what is selected is always a communication link of a macro cell with smallest interference in a list of candidate user equipment identities, so that interference generated by from D2D communication on a macro base station can be reduced.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Embodiment 1

Figure 1:
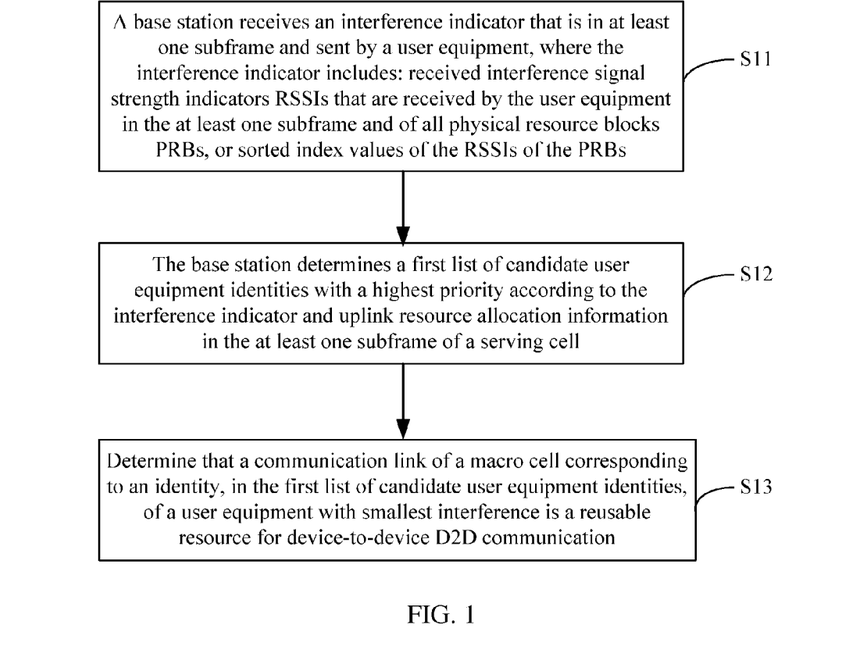
FIG. 1 is a flowchart of an interference coordination method according to Embodiment 1 of the present invention.

An interference coordination method is provided in Embodiment 1, where the method is executed by a base station. The method shown in FIG. 1 includes:

S11: A base station receives an interference indicator that is in at least one subframe and sent by a user equipment, where the interference indicator includes received signal strength indicators (RSSI) that are received by the user equipment in the at least one subframe and of all physical resource blocks (PRB), or sorted index values of the RSSIs of the PRBs.

S12: The base station determines a first list of candidate user equipment identities with a highest priority according to the interference indicator and uplink resource allocation information in the at least one subframe of a serving cell.

The foregoing serving cell is a cell managed by the base station and serving the user equipment. The foregoing first list of candidate user equipment identities includes a candidate user equipment identity of the serving cell and interference information of a communication link of a macro cell corresponding to the candidate user equipment identity of the serving cell.

S13: Determine that a communication link of a macro cell corresponding to an identity, in the first list of candidate user equipment identities, of a user equipment with smallest interference is a reusable resource for device-to-device (D2D) communication.

According to the method provided in this embodiment of the present invention, when a UE ID (English full name: user equipment identity) of a reusable resource for D2D communication is selected, what is selected is always a communication link of a macro cell with smallest interference in a list of candidate UE IDs, so that interference generated by D2D communication on a macro base station can be reduced.

Optionally, the foregoing method may further include after S13:

if the serving cell and a neighboring cell are not served by a same base station, send the first list of candidate UE IDs to a base station that serves the neighboring cell. In this way, the base station that serves the neighboring cell may refer to the first list of candidate UE IDs, so that the base station that serves the neighboring cell selects a UE ID of a reusable resource for D2D communication more properly.

Optionally, a method for implementing S12 may specifically be:

determining, by the base station, the first list of candidate user equipment identities with a highest priority according to the interference indicator and the uplink resource allocation information; acquiring, by the base station, a second list of candidate user equipment identities of a neighboring cell, where the second list of candidate user equipment identities includes a candidate user equipment identity of the neighboring cell and interference information of a communication link of a macro cell corresponding to the candidate user equipment identity of the neighboring cell; and adjusting the first list of candidate user equipment identities according to the second list of candidate user equipment identities. In addition, a manner of acquiring the foregoing second list of candidate user equipment identities is the same as a manner of acquiring the foregoing first list of candidate user equipment identities, and a difference lies in that: a cell corresponding to the second list of candidate user equipment identities is a neighboring cell, and a cell corresponding to the first list of candidate user equipment identities is a serving cell, where the neighboring cell may be a cell adjacent to the serving cell.

The foregoing adjusting the first list of candidate user equipment identities according to the second list of candidate user equipment identities specifically includes: deleting an identity of a user equipment with large interference in the neighboring cell from the first list of candidate user equipment identities, where the identity of the user equipment with large interference in the neighboring cell is specifically an identity, in the second list of candidate user equipment identities, of a user equipment whose interference strength exceeds a threshold.

In the interference coordination method described in Embodiment 1, interference generated by D2D communication on a macro base station can be effectively reduced.

Embodiment 2

Figure 2:
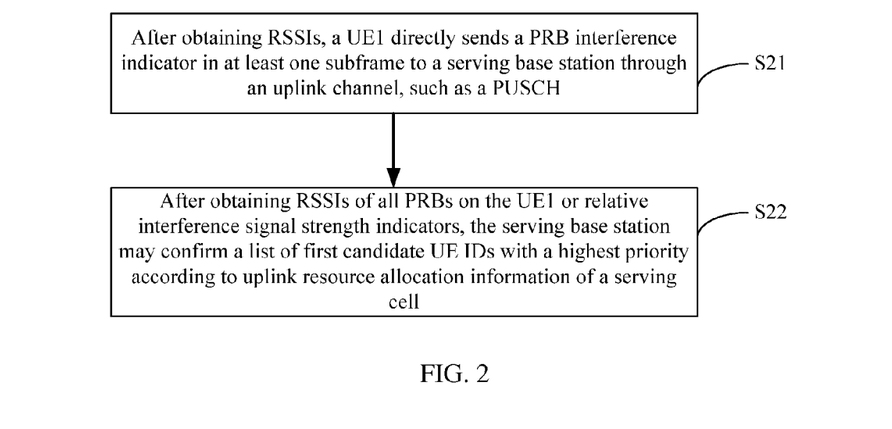
FIG. 2 is a flowchart of an interference coordination method according to Embodiment 2 of the present invention.

An interference coordination method is provided in Embodiment 2, where the method provided in this embodiment of the present invention is implemented in an LTE system, and device-to-device D2D communication in this embodiment works in an uplink frequency band of a macro base station. In this case, a UE1 can receive received signal interference strength indicators (RSSI) of all PRBs in an entire frequency band. In the LTE system, a system resource is allocated in unit of one subframe, that is, resource allocation in one subframe is consistent. Therefore, an RSSI value may be measured in a time length of 1 ms. In addition, it is possible that some users cannot be scheduled in a subframe due to reasons such as a limited capacity of a physical downlink control channel (full name: Physical Downlink Control Channel, PDCCH for short) in the subframe. As a result, signal strength estimation may be performed in unit of 1 ms for several times in a frame of 10 ms. As shown in FIG. 2, the method includes:

S21: After obtaining the received signal strength indicators (RSSI), a UE1 directly sends a PRB interference indicator in at least one subframe to a serving base station (eNodeB1) through an uplink channel, such as a physical uplink shared channel (English full name: Physical Uplink Shared Channel, PUSCH for short).

Certainly, S21 may also be replaced with the following: A UE1 sorts interference strength indicators of PRBs, and then sends index values of PRBs that are in at least one subframe and sorted in descending order (or ascending order) to a serving base station (eNodeB1) through an uplink channel such as a PUSCH or PUCCH. Data volume to be sent may be reduced by sending only an interference strength index value.

Figure 3:
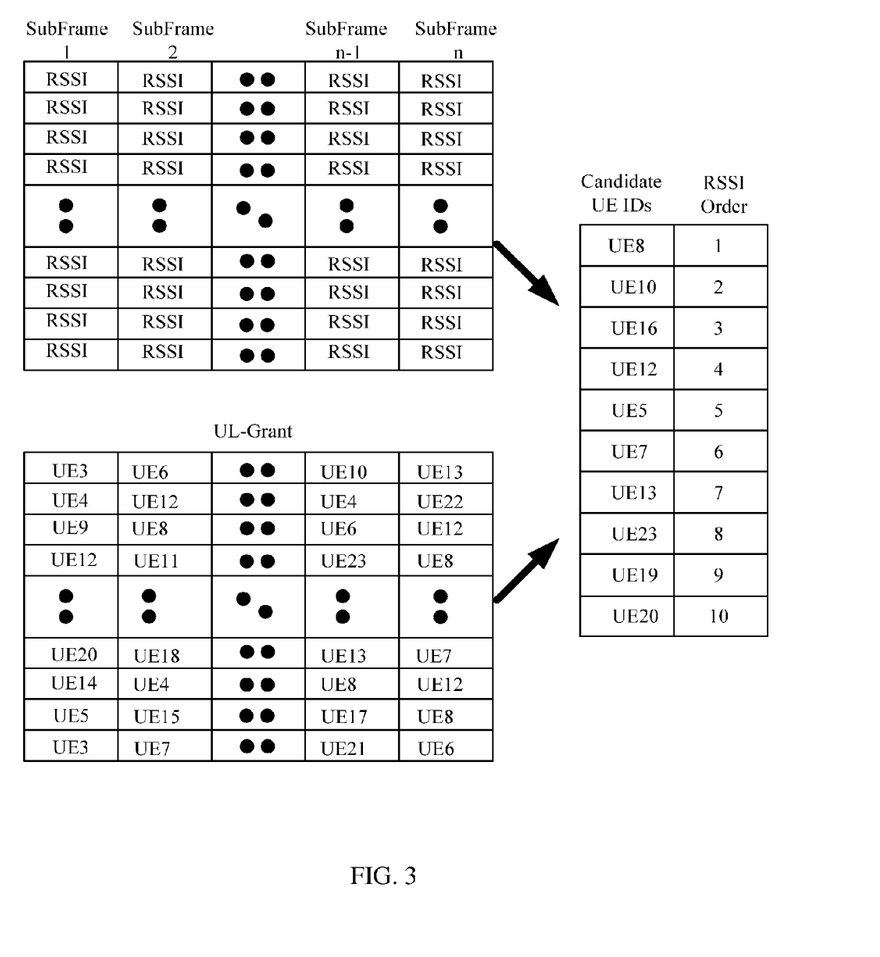
FIG. 3 is a schematic diagram of a first list of candidate user equipment identities according to Embodiment 2 of the present invention.

S22: After obtaining received signal strength indicators (RSSI) that are received by the UE1 and of all PRBs or relative received signal strength indicators (sorted PRB indexes), the serving base station (eNodeB1) may confirm a first list of candidate UE IDs (the list is shown in FIG. 3) with a highest priority with reference to uplink resource allocation information (UL-Grant) of a serving cell.

Certainly, in actual application, interference strength information on all the PRBs of the UE1 may be sent, through an X2 interface, to a base station (eNodeB2) that serves a neighboring cell. After obtaining the received signal strength indicators, on the UE1, of all the PRBs or the relative received signal strength indicators (the sorted PRB indexes), the eNodeB2 may also confirm a second list of candidate UE IDs with a highest priority with reference to uplink resource allocation information (UL-Grant) of the neighboring cell, where a size of the second list of candidate UE IDs may be set to K2; and the eNodeB2 sends, to eNodeB1, the second list of candidate UE IDs that is obtained by the eNodeB2 and uplink resource allocation information (UL-Grant), in one frame, of the neighboring cell. After acquiring the uplink resource allocation information of the neighboring cell, the eNodeB1 may obtain through calculation a proposed reusable PRB resource in each subframe, and may further determine reusable UE IDs with a highest priority of the serving cell with reference to the first list of candidate UE IDs and the uplink resource allocation information (UL-Grant) of the serving cell. In this case, a resource for D2D may be fully reused with a communication link of a macro cell corresponding to the reused UE IDs, so as to avoid causing relatively large interference to a base station side. In addition, a user equipment in the macro cell may be in high-speed movement, and therefore, a resource allocation process may be performed in a period of several subframes, or a subframe of 10 ms, or several frames of 10 ms.

Embodiment 3

Figure 4:
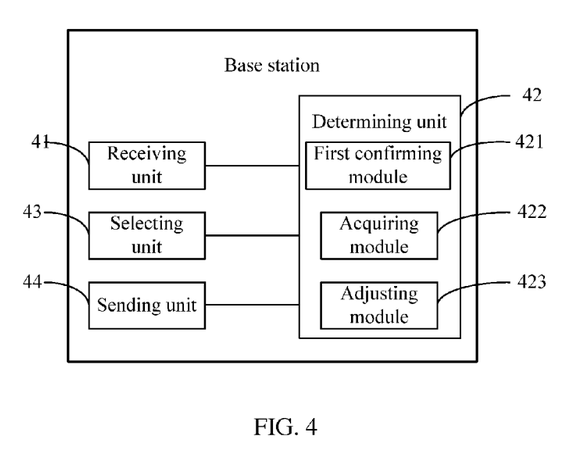
FIG. 4 is a structural diagram of a base station according to Embodiment 3 of the present invention.

A base station is provided in Embodiment 3, where the base station shown in FIG. 4 includes:

a receiving unit 41, configured to receive an interference indicator that is in at least one subframe and sent by a user equipment, where the interference indicator includes received signal strength indicators RSSIs that are received by the user equipment in the at least one subframe and of all PRBs, or sorted index values of the RSSIs of all the PRBs;

a determining unit 42, configured to determine a first list of candidate user equipment identities with a highest priority according to the interference indicator and uplink resource allocation information in the at least one subframe of a serving cell, where the serving cell is a cell managed by the base station and serving the user equipment, and the first list of candidate user equipment identities includes a candidate user equipment identity of the serving cell and interference information of a communication link of a macro cell corresponding to the candidate user equipment identity of the serving cell; and a selecting unit 43, configured to determine that a communication link of a macro cell corresponding to an identity, in the first list of candidate user equipment identities, of a user equipment with smallest interference is a reusable resource for device-to-device communication.

Optionally, the foregoing determining unit 42 is specifically configured to:

determine the first list of candidate user equipment identities with a highest priority according to the interference indicator and the uplink resource allocation information; acquire a second list of candidate user equipment identities of a neighboring cell, where the second list of candidate user equipment identities includes a candidate user equipment identity of the neighboring cell and interference information of a communication link of a macro cell corresponding to the candidate user equipment identity of the neighboring cell; and adjust the first list of candidate user equipment identities according to the second list of candidate user equipment identities.

Optionally, the determining unit 42 specifically includes:

a first confirming module 421, configured to determine the first list of candidate user equipment identities with a highest priority according to the interference indicator and the uplink resource allocation information;

an acquiring module 422, configured to: if the serving cell and a neighboring cell are served by a same base station, directly acquire a second list of candidate user equipment identities of the neighboring cell; and if the serving cell and the neighboring cell are not served by a same base station, receive a second list of candidate user equipment identities that is sent by a base station that serves the neighboring cell; where the second list of candidate user equipment identities includes a candidate user equipment identity of the neighboring cell and interference information of a communication link of a macro cell corresponding to the candidate user equipment identity of the neighboring cell; and an adjusting module 423, configured to delete an identity of a user equipment with large interference in the neighboring cell from the first list of candidate user equipment identities, where the identity of the user equipment with large interference in the neighboring cell is specifically an identity, in the second list of candidate user equipment identities, of a user equipment whose interference strength exceeds a threshold.

Optionally, the base station further includes:

a sending unit 44, configured to: if the serving cell and the neighboring cell are not served by a same base station, send the first list of candidate user equipment identities to the base station that serves the neighboring cell.

The base station described in Embodiment 3 can effectively reduce interference generated by D2D communication on a macro base station.

Embodiment 4

Figure 5:
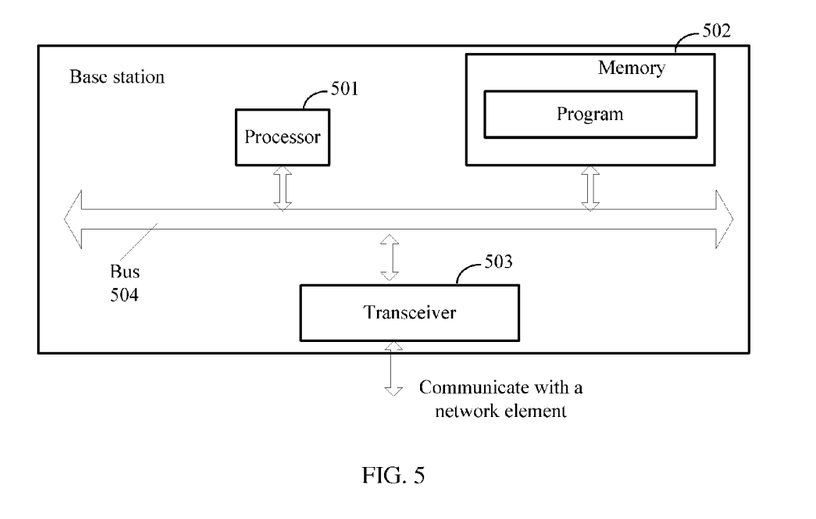
FIG. 5 is a structural diagram of a base station according to Embodiment 4 of the present invention.

A base station is provided in Embodiment 4, where a structural diagram of hardware of the base station is shown in FIG. 5. The base station includes: a processor 501, a memory 502, a transceiver 503, and a bus 504.

The processor 501, the memory 502, and the transceiver 503 are connected by the bus 504, where the bus 504 may be an industry standard architecture (ISA) bus, a peripheral component interconnect (PCI) bus, or the like.

The foregoing processor 501 may be a general purpose processor, including a central processing unit (CPU), a network processor (NP), or the like.

The memory 502 is configured to store a program. Specifically, the program may include program code, where the program code includes a computer operation instruction. The program is used to instruct the processor 501 to issue the computer operation instruction. The memory 502 may include a high-speed random access memory (RAM), and may also include a non-volatile memory (non-volatile memory), such as at least one disk memory.

The transceiver 503 is configured to receive or send data, information, or a list.

The transceiver 503 is configured to receive an interference indicator that is in at least one subframe and sent by a user equipment, where the interference indicator includes received signal strength indicators RSSIs that are received by the user equipment in the at least one subframe and of all PRBs, or sorted index values of the RSSIs of all the PRBs.

The processor 501 is configured to: determine a first list of candidate user equipment identities with a highest priority according to the interference indicator and uplink resource allocation information in the at least one subframe of a serving cell, where the serving cell is a cell managed by the base station and serving the user equipment, and the first list of candidate user equipment identities includes a candidate user equipment identity of the serving cell and interference information of a communication link of a macro cell corresponding to the candidate user equipment identity of the serving cell; and determine that a communication link of a macro cell corresponding to an identity, in the first list of candidate user equipment identities, of a user equipment with smallest interference is a reusable resource for device-to-device (D2D) communication.

Optionally, the processor 501 is specifically configured to: determine the first list of candidate user equipment identities with a highest priority according to the interference indicator and the uplink resource allocation information; acquire a second list of candidate user equipment identities of a neighboring cell, where the second list of candidate user equipment identities includes a candidate user equipment identity of the neighboring cell and interference information of a communication link of a macro cell corresponding to the candidate user equipment identity of the neighboring cell; and adjust the first list of candidate user equipment identities according to the second list of candidate user equipment identities.

Optionally, the acquiring, by the processor 501, a second list of candidate user equipment identities of a neighboring cell may be specifically: if the serving cell and the neighboring cell are served by a same base station, directly acquiring the second list of candidate user equipment identities of the neighboring cell; and if the serving cell and the neighboring cell are not served by a same base station, controlling the transceiver 503 to receive the second list of second candidate user equipment identities that is sent by a base station that serves the neighboring cell.

Optionally, if the serving cell and the neighboring cell are not served by a same base station, the transceiver 503 sends the first list of candidate user equipment identities to the base station that serves the neighboring cell.

The base station described in Embodiment 4 may effectively reduce interference generated by D2D communication on a macro base station.

Modules or units included in the foregoing unit and system embodiments are merely divided according to function logic. However, the division is not limited thereto provided that corresponding functions can be implemented. In addition, the specific name of each functional unit or module is only for the convenience of differentiation and is not intended to limit the protection scope of the present invention.

A person skilled in the art may understand that all or some of the steps of the technical solutions in the embodiments of the present invention may be implemented by a program instructing relevant hardware, such as by a computer by running a program. The program may be stored in a readable storage medium, such as a random access memory, a magnetic disk, or an optical disc.

The foregoing descriptions are merely exemplary embodiments of the present invention, but are not intended to limit the present invention. Any modification, equivalent replacement, or improvement made without departing from the spirit and principle of the present invention should fall within the protection scope of the present invention.

What is claimed is:

1. An interference coordination method, comprising:
    receiving, by a base station, an interference indicator that is in at least one subframe and sent by a user equipment, wherein the interference indicator comprises at least one of received signal strength indicators (RSSIs) that are received by the user equipment in the at least one subframe and that are of all physical resource blocks (PRBs), or sorted index values of the RSSIs of all the PRBs;
    determining, by the base station, a first list of candidate user equipment identities with a highest priority according to the interference indicator and uplink resource allocation information in the at least one subframe of a serving cell, wherein the serving cell is a cell managed by the base station and serving the user equipment, and wherein the first list of candidate user equipment identities comprises a candidate user equipment identity of the serving cell and interference information of a communication link of a macro cell corresponding to the candidate user equipment identity of the serving cell; and
    determining, by the base station, that a communication link of a macro cell corresponding to an identity, in the first list of candidate user equipment identities, of a user equipment with smallest interference is a reusable resource for device-to-device (D2D) communication.

2. The method according to claim 1, wherein the determining, by the base station, a first list of candidate user equipment identities with a highest priority according to the interference indicator and uplink resource allocation information in the at least one subframe of a serving cell comprises:
    determining, by the base station, the first list of candidate user equipment identities with a highest priority according to the interference indicator and the uplink resource allocation information;
    acquiring, by the base station, a second list of candidate user equipment identities of a neighboring cell, wherein the second list of candidate user equipment identities comprises a candidate user equipment identity of the neighboring cell and interference information of a communication link of a macro cell corresponding to the candidate user equipment identity of the neighboring cell; and
    adjusting the first list of candidate user equipment identities according to the second list of candidate user equipment identities.

3. The method according to claim 2, wherein the adjusting the first list of candidate user equipment identities according to the second list of candidate user equipment identities comprises:
    deleting an identity of a user equipment with large interference in the neighboring cell from the first list of candidate user equipment identities, wherein the identity of the user equipment with large interference in the neighboring cell is an identity, in the second list of candidate user equipment identities, of a user equipment having an interference strength that exceeds a threshold.

4. The method according to claim 2, wherein the acquiring, by the base station, a second list of candidate user equipment identities of the neighboring cell comprises:
    directly acquiring, by the base station, the second list of candidate user equipment identities of the neighboring cell when the serving cell and the neighboring cell are served by a same base station; and
    receiving, by the base station, the second list of candidate user equipment identities that is sent by a base station that serves the neighboring cell when the serving cell and the neighboring cell are not served by a same base station.

5. The method according to claim 1, further comprising:
    sending, by the base station and after the determining that the communication link of the macro cell corresponding to the identity of the user equipment with smallest interference is the reusable resource for D2D communication, the first list of candidate user equipment identities to the base station that serves a neighboring cell when the serving cell and the neighboring cell are not served by a same base station.

6. A base station, comprising:
    a transceiver configured to receive an interference indicator that is in at least one subframe and sent by a user equipment, wherein the interference indicator comprises at least one of received signal strength indicators (RSSIs) that are received by the user equipment in the at least one subframe and that are of all physical resource blocks (PRBs), or sorted index values of the RSSIs of all the PRBs;
    a bus;
    a processor connected to the transceiver by the bus; and
    a non-transitory computer readable memory connected to the processor and having stored therein instructions that, when executed, cause the processor to:
        determine a first list of candidate user equipment identities with a highest priority according to the interference indicator and uplink resource allocation information in the at least one subframe of a serving cell, wherein the serving cell is a cell managed by the base station and serving the user equipment, and wherein the first list of candidate user equipment identities comprises a candidate user equipment identity of the serving cell and interference information of a communication link of a macro cell corresponding to the candidate user equipment identity of the serving cell; and
        determine that a communication link of a macro cell corresponding to an identity, in the first list of candidate user equipment identities, of a user equipment with smallest interference is a reusable resource for device-to-device (D2D) communication.

7. The base station according to claim 6, wherein the non-transitory computer readable memory further has stored therein instructions that, when executed, cause the processor to:
    determine the first list of candidate user equipment identities with a highest priority according to the interference indicator and the uplink resource allocation information;
    acquire a second list of candidate user equipment identities of a neighboring cell, wherein the second list of candidate user equipment identities comprises a candidate user equipment identity of the neighboring cell and interference information of a communication link of a macro cell corresponding to the candidate user equipment identity of the neighboring cell; and adjust the first list of candidate user equipment identities according to the second list of candidate user equipment identities.

8. The base station according to claim 7, wherein the non-transitory computer readable memory further has stored therein instructions that, when executed, cause the processor to:

directly acquire the second list of candidate user equipment identities of the neighboring cell when the serving cell and the neighboring cell are served by a same base station; and control the transceiver to receive the second list of second candidate user equipment identities that is sent by a base station that serves the neighboring cell when the serving cell and the neighboring cell are not served by a same base station.

9. The base station according to claim 6, wherein the transceiver is further configured to send the first list of candidate user equipment identities to the base station that serves a neighboring cell when the serving cell and the neighboring cell are not served by a same base station.

* * * * *